US010333322B2

(12) United States Patent
Arends

(10) Patent No.: US 10,333,322 B2
(45) Date of Patent: *Jun. 25, 2019

(54) SYSTEMS AND METHODS FOR BATTERY CHARGER WITH SAFETY COMPONENT

(71) Applicant: HORIZON HOBBY, LLC, Champaign, IL (US)

(72) Inventor: Gregory Arends, Mahomet, IL (US)

(73) Assignee: Horizon Hobby, LLC, Champaign, IL (US)

(*) Notice: Subject to any disclaimer, the term of this patent is extended or adjusted under 35 U.S.C. 154(b) by 220 days.

This patent is subject to a terminal disclaimer.

(21) Appl. No.: 15/080,010

(22) Filed: Mar. 24, 2016

(65) Prior Publication Data
US 2016/0285282 A1 Sep. 29, 2016

Related U.S. Application Data

(60) Provisional application No. 62/137,805, filed on Mar. 24, 2015, provisional application No. 62/163,148, filed on May 18, 2015.

(51) Int. Cl.
H02J 7/00 (2006.01)
(52) U.S. Cl.
CPC .......... H02J 7/0045 (2013.01); H02J 7/0054 (2013.01); H02J 7/0068 (2013.01)
(58) Field of Classification Search
CPC ....... H02J 7/0045; H02J 7/0054; H02J 7/0068
See application file for complete search history.

(56) References Cited

U.S. PATENT DOCUMENTS

| 5,422,560 A * | 6/1995 | Yan | H02J 7/0091 320/160 |
| 5,602,455 A * | 2/1997 | Stephens | H02J 7/0013 320/106 |
| 5,721,481 A * | 2/1998 | Narita | H02J 7/0013 307/46 |

(Continued)

FOREIGN PATENT DOCUMENTS

KR   10-1481342   1/2015

OTHER PUBLICATIONS

Traxxas Ez-Peak Plus—NiMH/LiPO Fast Charger Instructions, accessed at: https://traxxas.com/sites/default/files/HKC14012-R02_2970-TraxxasID-Charger-INST-EN.pdf. Available at least as of the filing date of the application.

(Continued)

Primary Examiner — Naum Levin
(74) Attorney, Agent, or Firm — Baker Botts L.L.P.

(57) ABSTRACT

A battery charger with an internal power storage device may be used to facilitate fast charging of a battery by using a high C-rate. A battery charger with an internal power storage device may include a control circuit that receives operating mode instructions to operate in a base charging mode or a fast charging mode. In the base charging mode, the battery charger may be configured to concurrently charge a battery and an internal power storage device at a base C-rate using current supplied from an external power source. In the fast charging mode, the battery charger may be configured to charge the battery at a high C-rate, which is substantially higher than the base C-rate, by using the internal power storage device.

9 Claims, 2 Drawing Sheets

(56) References Cited

U.S. PATENT DOCUMENTS

| | | | |
|---|---|---|---|
| 6,215,280 B1* | 4/2001 | Cavazzini | G06K 7/10851 320/132 |
| 6,429,623 B2* | 8/2002 | Hanada | H02J 7/345 320/116 |
| 6,700,352 B1* | 3/2004 | Elliott | H02J 7/0003 320/130 |
| 6,945,803 B2* | 9/2005 | Potega | G01K 1/02 374/E1.002 |
| 7,521,138 B2* | 4/2009 | Pearson | H01M 8/0491 320/101 |
| 7,656,120 B2* | 2/2010 | Neu | G06F 1/1632 320/112 |
| 8,054,039 B2* | 11/2011 | Bauerle | B60L 3/003 320/109 |
| 8,183,819 B2 | 5/2012 | Sugano | |
| 8,264,208 B2* | 9/2012 | Wardensky | H01G 11/14 320/166 |
| 8,288,997 B2 | 10/2012 | Choi | |
| 8,350,526 B2* | 1/2013 | Dyer | B60L 1/003 320/104 |
| 8,405,360 B2* | 3/2013 | Young | B60L 11/005 320/103 |
| 8,427,103 B2* | 4/2013 | Ohtomo | B60K 6/28 320/109 |
| 8,482,263 B2* | 7/2013 | Barrade | H02J 7/0054 320/103 |
| 8,716,977 B2 | 5/2014 | Walley et al. | |
| 8,860,359 B2* | 10/2014 | Cao | H01M 10/44 320/103 |
| 8,970,064 B2* | 3/2015 | Lecourtier | H02J 9/061 307/66 |
| 9,045,048 B2 | 6/2015 | Yukizane | |
| 9,054,396 B2 | 6/2015 | Cheng | |
| 9,059,590 B2 | 6/2015 | Cassidy | |
| 9,184,622 B2 | 11/2015 | Geris | |
| 9,233,617 B2* | 1/2016 | Ichikawa | B60L 11/1812 |
| 9,397,513 B2* | 7/2016 | Butler | H02J 7/0054 |
| 9,397,516 B2 | 7/2016 | Hunter | |
| 9,637,019 B2* | 5/2017 | Bassham | B60L 11/1837 |
| 9,847,654 B2* | 12/2017 | Beaston | H02J 7/0014 |
| 2003/0090239 A1* | 5/2003 | Sakakibara | H02J 7/0042 320/166 |
| 2003/0201754 A1 | 10/2003 | Conrad | |
| 2004/0155631 A1* | 8/2004 | Ishizu | H02J 7/0027 320/166 |
| 2006/0022633 A1* | 2/2006 | Nguyen | H02J 7/0003 320/106 |
| 2007/0279011 A1* | 12/2007 | Jones | H01G 9/14 320/167 |
| 2010/0072946 A1* | 3/2010 | Sugano | B60L 3/0046 320/108 |
| 2010/0134305 A1 | 6/2010 | Lu | |
| 2010/0289457 A1 | 11/2010 | Onnerud et al. | |
| 2010/0308775 A1* | 12/2010 | Mizutani | H01M 2/0215 320/162 |
| 2010/0315041 A1* | 12/2010 | Tan | H02J 7/0044 320/115 |
| 2011/0084648 A1* | 4/2011 | Cao | H01M 10/44 320/103 |
| 2011/0103628 A1* | 5/2011 | Bachler | H02J 7/0054 381/323 |
| 2011/0156620 A1 | 6/2011 | Yeh | |
| 2011/0227416 A1* | 9/2011 | Lecourtier | H02J 9/061 307/66 |
| 2012/0112688 A1 | 5/2012 | Ho | |
| 2012/0139480 A1* | 6/2012 | Kaneko | H01M 10/425 320/107 |
| 2012/0212174 A1* | 8/2012 | Ishikawa | B60L 11/1809 320/103 |
| 2012/0248870 A1* | 10/2012 | Coleman | H02J 7/345 307/48 |
| 2013/0049675 A1 | 2/2013 | Minami | |
| 2013/0049676 A1* | 2/2013 | Ishikawa | B60L 11/185 320/103 |
| 2013/0169228 A1* | 7/2013 | Yang | H02J 7/0016 320/110 |
| 2013/0282472 A1* | 10/2013 | Penilla | B60S 5/06 705/14.35 |
| 2013/0332019 A1* | 12/2013 | Goto | F16H 61/22 701/22 |
| 2014/0002023 A1* | 1/2014 | Ichikawa | B60L 11/1812 320/109 |
| 2014/0062414 A1* | 3/2014 | Yuhara | B60L 7/10 320/134 |
| 2014/0111139 A1 | 4/2014 | Chen et al. | |
| 2014/0300321 A1 | 10/2014 | Kim et al. | |
| 2015/0162780 A1 | 6/2015 | Heo | |
| 2015/0214770 A1* | 7/2015 | Chen | H02J 7/0065 307/19 |
| 2015/0288206 A1* | 10/2015 | Aronov | G01R 31/3606 320/114 |
| 2016/0006283 A1* | 1/2016 | Liu | H02J 7/0052 320/112 |
| 2016/0064962 A1* | 3/2016 | Huang | H02J 7/0055 320/114 |
| 2016/0064979 A1* | 3/2016 | Huang | H02J 7/0055 320/114 |
| 2016/0099580 A1* | 4/2016 | Kawamura | G01R 31/3606 320/106 |
| 2016/0099581 A1* | 4/2016 | Kawamura | H02J 7/0003 320/107 |
| 2016/0111905 A1* | 4/2016 | Duncan | H02J 7/0047 320/107 |
| 2016/0204638 A1* | 7/2016 | Miraglia | H02J 7/34 320/103 |
| 2016/0249908 A1* | 9/2016 | Shelton, IV | A61B 17/068 227/175.1 |
| 2016/0285289 A1* | 9/2016 | Arends | H02J 7/0054 |
| 2017/0279109 A1 | 9/2017 | Wang | |

OTHER PUBLICATIONS

Search Report issued in Int'l App. No. PCT/US2016/024002 (2016).
International Preliminary Report on Patentability for PCT Patent Application No. PCT/US2016/024002, dated Oct. 5, 2017; 9 pages.

\* cited by examiner

SYSTEMS AND METHODS FOR BATTERY CHARGER WITH SAFETY COMPONENT

PRIORITY CLAIM

This application claims priority to U.S. Provisional Application Ser. Nos. 62/137,805, filed Mar. 24, 2015, and 62/163,148, filed May 18, 2015, which are expressly incorporated by reference herein in their entireties.

BACKGROUND

Unless otherwise indicated herein, the description in this section is not itself prior art to the claims and is not admitted to be prior art by inclusion in this section.

One aspect of a rechargeable battery is the battery's charge current. This charge current is often expressed in relation to a C-rate to normalize against battery capacity because different batteries typically have different capacities. A C-rate is a measure of the rate at which a battery may be charged by a battery charger relative to the battery's maximum capacity. Batteries are made in a wide variety of chemistries, voltages, capacities, and charge rates. Battery chargers may be designed to work with a large number of available batteries.

Most conventional battery chargers charge typical rechargeable batteries at C-rates in a range of about 1 C to 3 C. At a 1 C rate, a conventional battery charger will ideally charge a typical battery to substantially full charge in about 1 hour. At a 3 C rate, a conventional battery charger will ideally charge a typical battery to substantially full charge in about 20 minutes.

For example, a 1000 milliampere hours (mAh) battery charged at a 1 C rate can ideally be fully charged in about one hour with a conventional battery charger with a charging current of 1000 mA. Similarly, a 1000 mAh battery charged at a 2 C rate can ideally be fully charged in about 30 minutes with a conventional battery charger with a charging current of 2000 mA, while a 1000 mAh battery charged at a 0.5 C rate would ideally be fully charged in about 2 hours with a conventional battery charger with a charging current of 500 mA.

SUMMARY

Recent advances in battery technology allow some batteries to be charged faster by applying more charge current to the battery. Some new batteries may also be charged at much higher C-rates, such as at a 10 C (or higher) rate. For example, some types of advanced 1000 mAh batteries can be charged at a 10 C rate, which can fully charge the battery in six minutes with a battery charger configured to supply 10 amperes ("Amps" or "A") of current at an appropriate voltage for the battery. Similarly, some advanced 1000 mAh batteries can be charged at a 30 C rate, which can fully charge the battery in 2 minutes with a battery charger configured to supply 30 Amps at an appropriate voltage for the battery.

Most conventional battery chargers are not capable of charging batteries at C-rates higher than about 1 C to 3 C due to various limitations. For example, both power and current limitations exist in standard household circuits where, typically, no more than about 1500 Watts ("W") are available per circuit and each circuit's current is limited by a household circuit breaker rated a particular current (e.g., a standard 15 A circuit breaker). In addition, most conventional battery chargers must typically be electrically connected to an operating power supply to charge a battery. Thus, charging at remote locations away from power outlets is difficult or impossible with a conventional charger that must be connected to an operating power supply via a wall socket or similar connection. Another shortcoming of conventional battery chargers is that they typically require bulky additional equipment (such as AC-DC converters or power supply adapters) that increases the difficulty of charging at locations away from power outlets.

Further complicating the process from a safety standpoint, the flexibility of modern battery chemistries allow some batteries to be charged more quickly than other, seemingly identical, batteries. C-rate is typically set by the battery manufacturer for specific battery models and may vary considerably between manufacturers of batteries of the same type, voltage and capacity.

Charging a battery with incorrect parameters may result in serious injury to people and/or property damage in the area surrounding the charging battery. For example, a battery charger that charges a battery using incorrect charging parameters may cause the battery to explode or catch fire, thus injuring people or damaging property in the area surrounding the battery. Battery charger manufacturers can mitigate charging accidents that result in injury or property damage, e.g., by simplifying the process of entering battery parameters into a battery charger. To avoid accidents, it is critical that the battery parameters for the charger are correctly matched to each battery being charged. It is especially critical to correctly set parameters for a battery charger capable of charging at high C-rates (e.g., 10-15 times higher than a base charge rate, such as a 3-C rate). For example, if a high C-rate charging process were applied to a normal battery, the battery would likely explode or catch fire due to being charged at an incompatibly high C-rate. Similarly, a critical aspect of safety design for a battery charger capable of charging batteries with high C-rates and high energy densities is how to ensure the battery charger applies the correct charging parameters to each battery it is charging.

Battery charger manufacturers have attempted to solve these problems with a model memory process or by using a magnetic stripe or RFID process. For the model memory process, the battery charger requires a user to pre-program the battery charger with a limited quantity (e.g., 1-20) of battery model numbers and associated charging parameters. During subsequent operation, entering the battery model number into the charger will then configure the charger with the previously programmed charging parameters for a particular battery model.

For the magnetic stripe or RFID process, the manufacturer identifies the battery and associated charging parameters with a code that is stored on a magnetic stripe or an RFID tag. During subsequent use, an RFID or magnetic stripe reader on the charger reads charging parameters from the RFID tag or the magnetic stripe and configures itself according to the charging parameters.

Drawbacks of using the existing model memory process include that the user must first program the charger with the correct charging parameters associated with an individual battery and for each subsequent charge cycle of the battery, must remember the battery model number associated with the battery. If the charge parameters are entered incorrectly during programming, or if the incorrect model number is entered into the charger, the charger will incorrectly charge the battery, possibly resulting in an explosion or fire. Drawbacks for the existing magnetic stripe process include that the magnetic stripe is very susceptible to damage by even a weak magnetic field. Further, a magnetic stripe must be programmed by someone with a magnetic card writer (i.e., not a typical consumer), so this process is not reverse compatible with existing batteries, or at least not easily accomplished with batteries that do not already have a magnetic stripe. Moreover, the amount of information that can be stored on the stripe is limited, similar to a conventional bar code, to a few hundred bits of data. Likewise, the RFID tag can be affected by electromagnetic fields (e.g., microwave ovens and security inspection systems). The RFID tag process is also not reverse compatible for existing batteries because RFID tags can only be programmed by the battery or charger manufacturer or someone with an RFID tag writer (i.e., not a typical consumer). Further, inexpensive RFID tags contain a limited amount of memory (e.g., 96-bit or 128-bit). This small amount of data is often not sufficient to store the necessary battery-specific charging information and to encrypt some or all of the battery-specific charging information. The model memory process and the magnetic stripe/RFID processes are poorly suited to addressing the problem of variable charge rates and particularly ill-suited to very high current charging (e.g., high C-rate charging) with a secure (e.g., encryptable) method for activating the higher charge rates.

In view of the foregoing, a need exists for a new and improved battery charger that can safely charge rechargeable batteries at (i) a base C-rate (or base C-rate charging mode) and/or (ii) a high C-rate (or high C-rate charging mode) when connected to a conventional household circuit or in locations where conventional household circuits are not available.

In some embodiments, systems and methods related to battery chargers may incorporate an internal power storage device (an internal power storage device may also be referred to throughout this specification as an internal power source or an "IPS"). The battery charger may operate in (i) a base C-rate mode (or conventional mode) where the battery charger is configured to charge one or more batteries at a base C-rate (or conventional C-rate), e.g., a C-rate of about 1 C to 3 C, and/or (ii) a high C-rate mode (or fast charge mode) where the battery charger is configured to charge one or more batteries at a high C-rate (e.g., a C-rate that is higher than the base C-rate, and in some cases substantially higher than the base C-rate). For example, in some embodiments, the battery charger may be configured to charge one or more batteries at a C-rate of about 7 C to 30 C when operating in the high C-rate mode.

As noted earlier, high C-rate charging may present difficulties due to, for example, power and current limitations of conventional household circuits. Beneficially, some embodiments described herein allow for high C-rate charging using a conventional household circuit. Some embodiments may additionally allow for high C-rate charging at a remote location (i.e., not connected to a household circuit). These as well as other aspects, advantages, and alternatives will become apparent to those of ordinary skill in the art by reading the following detailed description, with reference where appropriate to the accompanying drawings.

A battery charger according to some embodiments of the disclosed systems and methods includes (i) a power supply, (ii) a power storage device, and (iii) control circuitry. The control circuitry is configured to electrically connect the power supply and the power storage device to one or more batteries for charging. In some embodiments, the control circuitry may also be (i) coupled to a user interface on or associated with the battery charger and (ii) configured to receive operating mode instructions from the user interface.

In operation, the operating mode instructions indicate (i) a desired charging mode for the battery charger, such as a base charging mode or a fast charging mode and/or (ii) particular charging parameters for a battery, including particular charging parameters for base charging or fast charging. In some embodiments, the control circuitry is also configured to operate the battery charger in the desired charging mode to charge one or more batteries and/or to configure the charger with the particular charging parameters.

In some embodiments, the power supply of the battery charger is configured to couple to an external power source, such as a conventional household circuit. While operating in the base charging mode, the battery charger can concurrently charge both the power storage device of the battery charger and the one or more batteries at a base C-rate by using current from the external power source. While operating in the fast charging mode, the battery charger can charge the battery using the power storage device of the battery charger at a high C-rate, where the high C-rate is higher than the base C-rate, and in some instances, substantially higher than the base C-rate.

In some embodiments, the control circuitry is further configured to control the charging rate of the battery charger when the battery charger is operating in the high C-rate mode. In such embodiments, the battery charger controls the charging rate in the high C-rate mode based on battery characteristics. In some embodiments, the battery characteristics are received from the battery.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

Figure 1:
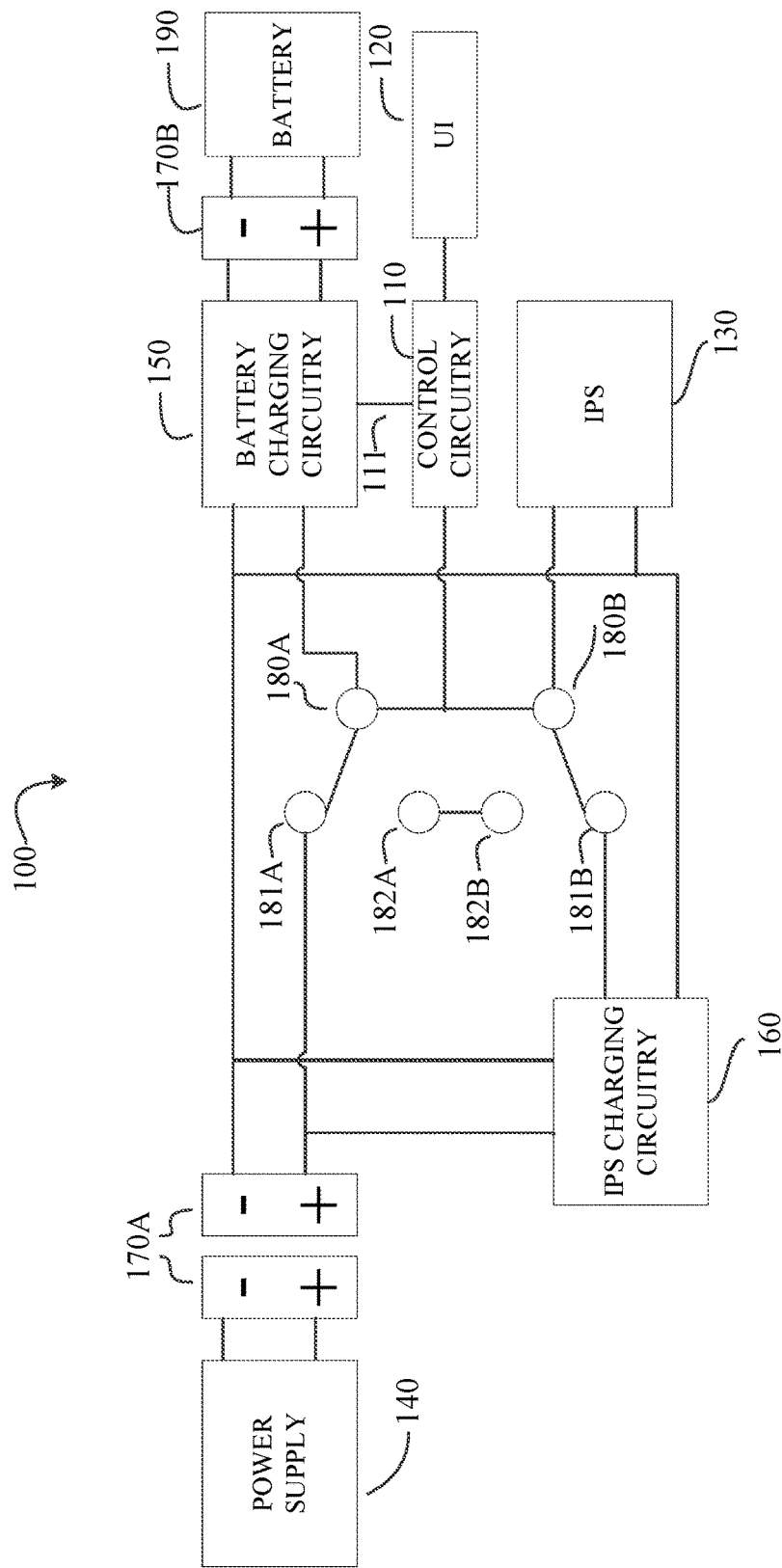
FIG. 1 illustrates a simplified block diagram illustrating components of a battery charger, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments relate to battery chargers, which may be used with various batteries for use in various systems, such as batteries for remote controlled vehicles or other devices which use rechargeable batteries, e.g., flashlights, cameras, mobile phones, laptop computers, tablet computers, children's toys, remote controls, and music players. In particular, example embodiments may relate to or take the form of methods and systems for facilitating a high C-rate charge of one or more batteries, including but not necessarily limited to batteries for use with remote controlled vehicles. Example embodiments may include a safety component, such as an optical scanner that is either integrated into the charger or otherwise in communication with the charger (e.g., wirelessly connected via a smart phone). In contrast to previous systems (e.g., model memory or RFID systems), the battery charger system is capable of storing, and possibly encrypting, the charging parameters and/or other information required to configure the battery charger to charge the battery. For example, in embodiments where an optical scanner is the safety component, an optical code (e.g., a QR code) may be used to store battery-specific information. The optical code may be placed on a battery (e.g., as part of a battery label) and the battery charger may retrieve battery-specific information by scanning the battery label with the optical scanner. Further, the optical code may be configured as a secure QR code, or encrypted QR code, such that the battery-specific information is encrypted. Use of an encrypted QR code may mitigate safety risks. In some implementations, high C-rate charging or other parameters are only enabled only after using the safety component to receive and decrypt the encrypted battery-specific information. A manufacturer may choose to not share the decryption process with consumers in an effort to reduce charging errors and resulting damages and/or injuries.

Most QR codes are capable of storing over 3 KB of data at very low cost, thus allowing all (or substantially all) battery-specific parameters to be stored in a QR code on a battery label. The battery label may be placed on the battery itself by the manufacturer or perhaps by the consumer. The battery label may alternatively be displayed on a screen (e.g., on a computer screen or smart phone screen). As such, the battery label cost will be non-existent or extremely low cost, e.g., because the battery labels may be displayed electronically. Alternatively, the battery labels will be low cost because the labels may be printed on regular printer paper on a typical household printer. The battery charger can then scan the optical code and receive the battery-specific charging information.

In some embodiments, the battery charger may include one or more processors, data storage, and program instructions (e.g., as part of control circuitry 110 discussed below). The one or more processors may include one or more general-purpose processors and/or one or more special purpose processors (e.g., digital signal processors, application specific integrated circuits, etc.). In operation, the one or more processors are configured to execute computer-readable program instructions that are stored in data storage and executable to provide at least part of the battery charger functionality described herein.

The data storage may include or take the form of one or more computer-readable storage media that may be read or accessed by the one or more processors. The one or more computer-readable storage media may include volatile and/or non-volatile storage components, such as optical, magnetic, organic or other memory or data storage, which may be integrated in whole or in part with at least one of the one or more processors. In operation, the data storage may include computer-readable program instructions for operating the battery charger as well as perhaps additional data, such as diagnostic data relating to the operation of the battery charger.

In some embodiments, the battery charger includes one or more communications interfaces. The one or more communications interfaces may include wireless interfaces and/or wireline interfaces, which allow the battery charger to communicate via one or more networks. In embodiments with one or more wireless interfaces, the wireless interface(s) may provide for communication under one or more wireless communication protocols, such as Bluetooth, WiFi (e.g., an IEEE 802.11 protocol), a radio-frequency ID (RFID) protocol, near-field communication (NFC), and/or other wireless communication protocols, such as protocols designed for use with radio controlled vehicles. In embodiments with one or more wireline interfaces, the wireline interface(s) may include an Ethernet interface, a Universal Serial Bus (USB) interface, or similar interface to communicate via a wire, a twisted pair of wires, a coaxial cable, or other physical connection to a wireline network. In embodiments with one or more communications interfaces, the battery charger may communicate with batteries, other battery chargers, and/or other devices (e.g., a ground station of a remote controlled vehicle or an unmanned aerial vehicle) via the one or more communications interfaces.

II. Illustrative Embodiments

A. Battery Charger Example Components and Base Charging Mode

FIG. 1 depicts a simplified diagram of a battery charger 100 according to some embodiments. The battery charger 100 includes control circuitry 110, link 111, user interface ("UI") 120, IPS 130, power supply 140, battery charging circuitry 150, IPS charging circuitry 160, connectors 170A and 170B, switches 180A and 180B, and terminals 181A, 181B, 182A, and 182B. FIG. 1 is representative only and not all components are shown. For example, additional electrical, structural, and/or restraining components may not be shown.

Control circuitry controls the positioning of switches 180A and 180B to operate the battery charger 100 in either the base mode or the fast charge mode. When switch 180A is connected to terminal 181A and switch 180B is connected to terminal 181B, the battery charger is operating in the base mode. And when switch 180A is connected to terminal 182A and switch 180B is connected to terminal 182B, the battery charger is operating in the fast charge mode.

As shown in FIG. 1 and described more fully below, battery charger 100 may operate in a base charging mode, where IPS 130 and a battery connected to battery charging circuitry 150 via connector 170B are concurrently charged at a base C-rate by using a base current from the power supply 140. Alternatively, the IPS 130 may be charged by IPS charging circuitry 160 using the base charging mode, regardless of whether a battery is connected and/or being charged.

Control circuitry 110 is coupled to a user interface 120. User interface 120 may be a simple interface, such as a switch, or any other type of interface. For example, user interface 120 may include a touch screen, one or more LEDs, and/or a speaker. User interface 120 may also include a magnetic reader, a radio-frequency identification reader, and/or an optical sensor and image processing circuitry. Alternatively or in combination, user interface 120 may include a software application that interfaces with a smartphone app, that configures the smartphone to act as a remote user interface with any of the user interface functionality described herein. In the embodiment shown in FIG. 1, control circuitry 110 is electrically connected to the IPS 130, the power supply 140, the battery charging circuitry 150, the IPS charging circuitry 160, connectors 170A and 170B, switches 180A and 180B, and battery 190. Depending on the configuration of the charger, some of these elements may be omitted or arranged differently than depicted in FIG. 1.

In operation, according to some embodiments, control circuitry 110 is coupled to user interface 120 and is electrically connected to IPS 130, power supply 140, and a battery 190 connected to connector 170B. Control circuitry 110, battery charging circuitry 150, and/or IPS charging circuitry 160 may include power switches with high current ratings (e.g., 40A or more). In some examples, control circuitry 110 and IPS charging circuitry 160 use power MOSFETs (metal-oxide-semiconductor field-effect transistors) with high current ratings (e.g., 40 A or more) that are at least sufficient to handle the current from IPS 130. In some embodiments, MOSFETs (such as n-channel MOSFETs and p-channel MOSFETs) may be used to implement logic gates and other digital circuits (e.g., as switches 180A and 180B).

In some embodiments, the power supply 140 may be a switch mode power supply. Due to possible operation in a wide variety of locations around the world, the power supply 140 may need to accommodate many different input voltages. To accomplish this, in some embodiments, the power supply 140 is a universal input voltage, high efficiency alternating-current ("AC") to direct-current ("DC") switch mode power supply. In such embodiments, the power supply 140 may include a switch mode power supply that can output 12 volts ("V"), 10 amperes ("A"), and 120 watts ("W") of regulated DC output from a power source that supplies 100-240 V AC at a frequency of 50 or 60 Hertz ("Hz").

In some embodiments, IPS charging circuitry 160 is a buck-boost converter configured to utilize the "unused" capacity of the battery charging circuitry 150. For example, if the battery charging circuitry 150 is configured to output 120 W but is only using 100 W, IPS charging circuitry 160 can utilize the 20 W of "unused" capacity of power supply 140 to recharge the IPS 130. In some embodiments, the IPS 130 is configured to supply up to 12-17 V, 40 A, and 700 W of unregulated DC output. In this example, the IPS 130 and battery charging circuit 150 are capable of charging a 3 A battery at 13C (39 A and 4.6 minutes) in fast charge mode. Even higher C-rates may be accomplished by using IPS 130 and battery charging circuitry 150 built with higher ampere rated MOSFETs.

In some embodiments, IPS 130 is a low resistance, high capacity power storage device. For example, IPS 130 may include one or more ultra-capacitors, one or more super-capacitors, one or more electric double-layer capacitors, a battery, or another energy storage device capable of very high current delivery for multiple cycles. In operation, IPS 130 retains power once it is charged for a set period of time unless it is discharged. For example, current lithium-ion polymer batteries are designed to retain power for at least 30 days and may be used alone or in combination with other components as the IPS 130. Thus, battery charger 100 can be used in a different place or at a later time, after IPS 130 has been charged.

Moreover, the capacity of the IPS 130 may be specifically designed for a certain set of batteries. In some embodiments, the battery charger 100 is designed with an IPS 130 meant to base charge and fast charge batteries intended to be used for aerial vehicles that use batteries in the general range of 11.1 V to 22.2 V and 2,000 mAh-10,000 mAh capacity. For example, IPS 130 may be configured to charge an 11.1 V (i.e., 3 cells of 3.7 volts connected in series in a single lithium-ion polymer battery pack), 3000 mAh battery at a fast charge rate of 12 C (i.e., fully charge in 5 minutes), and in such a configuration, the IPS 130 includes a 14.8 V (i.e., 4 cells of 3.7 volts connected in series in a single lithium-ion polymer battery pack) battery, capable of a continuous discharge current of 36 A or more and a minimum capacity of 3300 mAh.

An additional benefit of using a battery as the IPS 130 is that a battery can be easily replaced to overcome wear-out conditions experienced over the lifetime of the battery charger 100. In other embodiments, the IPS 130 may include other power storage devices, such as one or more capacitors, super-capacitors, graphene, or any other low resistance, high capacity power storage device.

Because the IPS 130 and the battery 190 connected to battery charging circuit 150 and connector 170B may be charged over a period of time at the base charging rate, power supply 140 can be smaller, more efficient, and lower cost than a conventional power supply that would be required to charge at the high C-rate of the fast charging mode. Moreover, power supply 140 will more easily comply with noise emissions (e.g., 2004/108/EC, FCC 47 CFR radiated emissions, etc.) and electrical safety standards (EN55014-2 for electrostatic discharge, radiated susceptibility, electrical fast transients, surge immunity, conducted susceptibility, electromagnetic compatibility, etc.) than conventional power supplies configured to charge batteries at similar high C-rates.

In practice, battery charger 100 may be installed in a workshop, vehicle, or other location. In this example, connectors 170A allow power supply 140 to be either external to the battery charger 100 or integrated within battery charger 100. Of course, in other embodiments, the battery charger 100 may be configured to not include power supply 140, but rather to connect to an external power supply due to weight, cost, size, or other constraints. In such examples, control circuitry 110 may be electrically connected to power connectors 170A, which in turn connect to (an external) power supply 140.

In some embodiments, an external power supply 140 may be disconnected from battery charger 100 after IPS 130 has been fully charged. IPS 130 can then provide all power to battery charging circuit 150 and a battery connected to 170B can be charged at base C-rate current or high C-rate current charging levels.

In some embodiments, control circuitry 110 is configured to receive operating mode instructions and/or battery-specific charging data from user interface 120 and/or control circuitry 110 (e.g., via an optical sensor or other safety component). Operating mode instructions may include instructions on whether the charger should operate at (i) a base, or conventional, charging mode using a base C-rate (such as 1 C to 3 C) for charging the battery or (ii) at a fast operating mode using a high C-rate (such as 10 C to 30 C) for charging the battery. For example, user interface 120 may be a two-position switch or toggle whose position indicates the desired operating mode. The C-rates may be received from user interface 120 or may be determined, for example, by the characteristics of the battery to be charged by the charger. Moreover, the C-rates may be variable. For example, the C-rates may vary based on a battery characteristic, such as a temperature rating, or an operational condition of the battery, such as a battery temperature (e.g., the battery temperature may be sensed by a temperature sensor installed in, or added to, a battery). The C-rates may also vary if the charger is configured to charge different batteries with varying characteristics or by user input (e.g., from user input at the user interface 120, such as touch input where user interface 120 is a touchscreen). Battery-specific charging data (or battery charging characteristics) may include information related to the specific battery to be charged, such as its C-rate, voltage rating, current rating, capacity, chemistry (e.g., L—Po or NiMH), and/or other battery and charging characteristics.

In some embodiments, when in the base charging mode, the charger is configured to concurrently charge the battery and the IPS 130 at the base C-rate by using current (or "unused" capacity) from power supply 140 as described herein, and when in the fast charging mode, the charger is configured charge the battery using the IPS 130 at a high C-rate.

In some embodiments, battery charger 100 includes battery charging circuitry 150 that is electrically connected to control circuitry 110 and the battery to be charged. In operation, battery charging circuitry 150 is configured to limit one or more battery charging characteristics for the battery to improve safety and reliability of battery charger 100. In some embodiments, battery charging circuitry 150 may comprise a battery management system. For example, battery charging circuitry 150 may prevent, or at least reduce the likelihood that, charging the battery will cause situations such as over-current, over-charging, under-voltage, over-temperature, over-pressure, cell imbalance, and/or ground fault. In some embodiments, instead of separate battery charging circuitry 150, control circuitry 110 may be configured to perform the functions of the battery charging circuitry 150.

In some embodiments, battery charger 100 includes IPS charging circuitry 160 that is electrically connected to control circuitry 110 and IPS 130. In operation, IPS charging circuitry 160 is configured to limit one or more IPS charging characteristics to improve safety and reliability of the battery charger 100. In some embodiments, IPS charging circuitry 160 may comprise a battery management system. IPS charging circuitry 160 may prevent, or at least reduce the likelihood that, charging the IPS will cause situations such as over-current, over-charging, under-voltage, over-temperature, over-pressure, cell imbalance, and/or ground fault. Instead of separate IPS charging circuitry 160, control circuitry 110 may be configured to perform the functions of the IPS charging circuitry 160.

In some embodiments, control circuitry 110 receives battery characteristics data (or battery characteristics input), e.g., from user interface 120 or some other component, such as an optical reader. For example, battery characteristics input may include battery capacity, battery voltage, temperature (e.g., cut-off temperature or maximum recommended temperature), battery chemistry, or cell configuration. Alternatively, control circuitry 110 may receive battery characteristics input from the battery. If control circuitry 110 receives input from the battery, real-time input may be provided, such as real-time temperature and charging progress. As used throughout the specification, battery-specific charging data may include battery charging characteristics, battery characteristics input, and/or any other data related to charging a battery (e.g., connector type, dimensions, etc.).

B. Battery Charger Fast Charging Mode

As described herein, battery charger 100 operates in fast charge mode when switch 180A is connected to terminal 182A and switch 180B is connected to terminal 182B. In a similar manner, one or more MOSFET switches (e.g., an n-channel MOSFET) may be used to switch battery charger 100 into (and out of) fast charging mode. Although battery charger 100 is described as utilizing both a base charging mode and a fast charging mode, battery charger 100 may also be configured such that it only charges batteries in a fast charging mode or base charging mode.

As shown in FIG. 1, in fast charging mode, current flows from IPS 130 to the battery (e.g., through battery charging circuitry 150 and battery connector 170B) at a high C-rate. In this embodiment, control circuitry 110 receives or identifies battery characteristics (e.g., how much current can be safely provided to the battery). Control circuitry 110 may receive battery characteristics in a number of ways, including, without limitation: (i) by the shape of the battery acting as a mechanical key, (ii) through use of an optical scanner (e.g., QR code scanner or barcode scanner), (iii) by the battery charger including multiple connectors, each of which connect only to certain types of batteries, and/or (iv) from the battery which may couple to control circuitry 110, e.g., through the optional communication link 111 shown in FIG. 1. In response to receiving the battery characteristics, control circuitry 110 may optimally adjust the C-rate, current flow, voltage, or other charging parameters.

Figure 2:
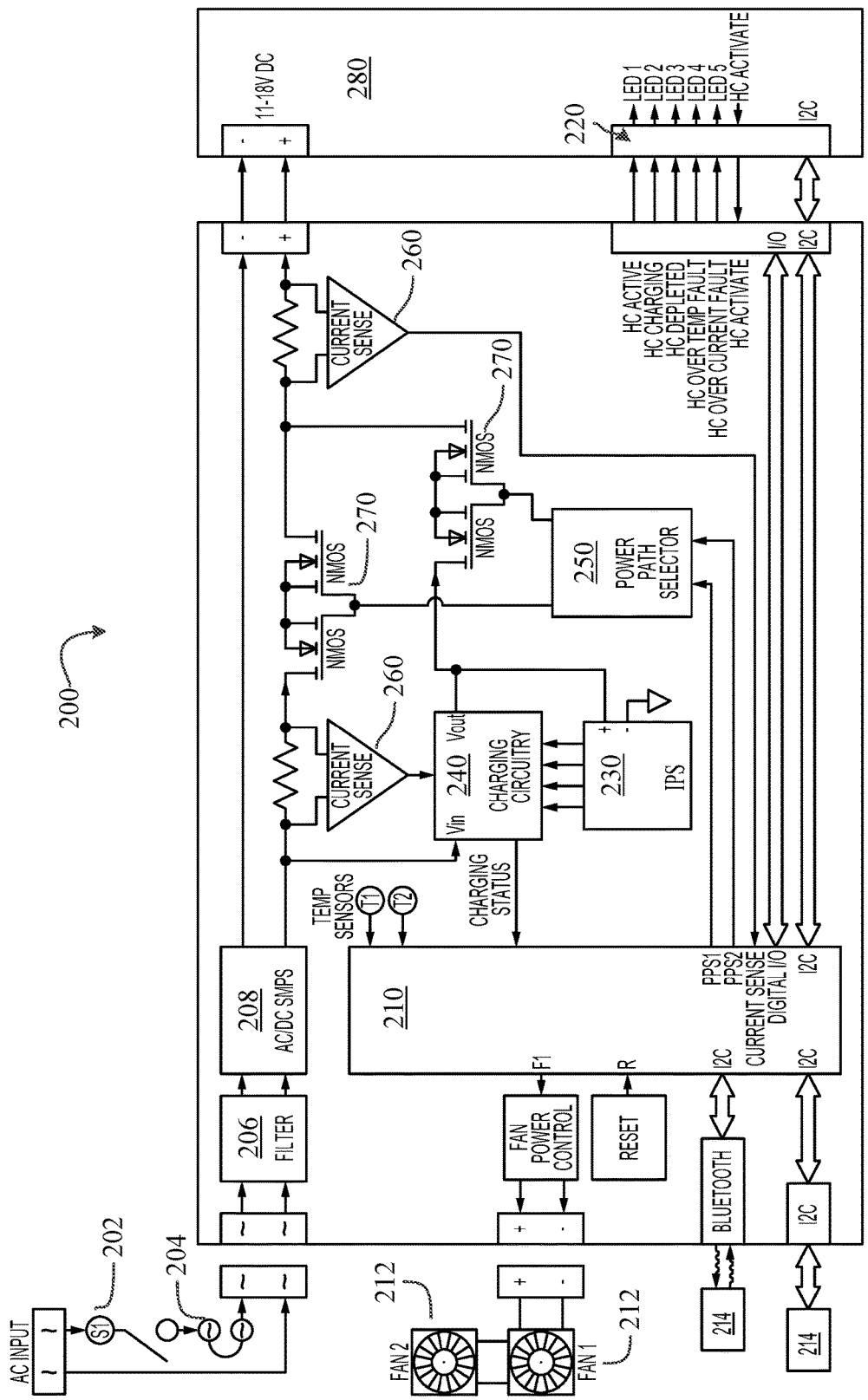
FIG. 2 illustrates a simplified block diagram illustrating components of a battery charger, according to an example embodiment.

FIG. 2 illustrates a simplified circuit diagram illustrating components of a battery charger 200, according to an example embodiment. Battery charger 200 includes a power switch 202, a circuit breaker 204, a filter 206, an AC/DC switch mode power supply 208, a microprocessor 210, fans 212, one or more safety and user interface components 214, a battery charger module interface 220, an internal power source (IPS) 230, IPS charging circuitry 240, a power path selector 250, current sensing circuitry 260, MOSFETs 270, and a battery charger module 280. FIG. 2 is representative only and not all components are shown. For example, additional electrical, structural, and/or restraining components may not be shown. In some embodiments, elements of FIG. 2 may be omitted. For example, battery charger module 280 may be included as part of battery charger 200 or may be a separate component from battery charger 200. For purposes of this application, a battery charger 200 mode that operates the charger to charge at a high C-rate (e.g., over 3 C) may be referred to as a fast charge mode, a High-C charge mode, and/or a "HC" mode.

In operation, in some embodiments, battery charger 200 may be plugged into a variety of AC voltage sources, for example, ranging from 100 V to 240 V with frequencies of 50 Hz to 60 Hz. Power passes from the AC input through a power switch 202, e.g., a user activated, ON/OFF rocker switch and a circuit breaker 204. Circuit breaker 204 may have reset functionality, such as a push button reset. Power then passes through a filter 206, such as an electromagnetic filter (e.g., a single line EMI filter or a power line filter) to reduce electromagnetic emissions and electrostatic discharge susceptibility.

Battery charger 200 may also include a Switch Mode Power Supply (SMPS) 208 (e.g., an AC/DC SMPS) where power is rectified to DC and regulated by circuitry that will maintain a specific output voltage (such as 12 V DC) with a specific maximum output rating (such as 10 A (120 W)). Other output voltages and power levels may be chosen for specific applications. The SMPS 208 may monitor its output to detect any sign of current draw exceeding the operational limit of the supply (i.e., an Over Current Fault) and, to prevent damage, will shut down the battery charger 200. A signal indicating an Over Current Fault will be passed to the microprocessor 210 if this occurs. The microprocessor 210 may then set appropriate output status signals, such as changing the status of the battery charger module interface 220. As illustrated in FIG. 2, the microprocessor 210 may light LEDS using battery charger module interface 220 to indicate an Over Current Fault.

To monitor the thermal performance of battery charger 200, temperature sensors, (illustrated in FIG. 2 as temperature sensors T1 and T2) may be connected to the microprocessor 210. For example, T1 and T2 may be attached to heat sinks (not shown) of the battery charger 200 to allow the microprocessor to monitor the thermal performance of the system and adjust the speed of the cooling fans 212 as necessary.

Current sensors are used to allow the battery charger 200 to monitor real time current output of the SMPS 208 and the IPS 230. Examples of current sensors include digital/inductive current sensors, closed loop current sensors, and open loop current sensors. As illustrated in FIG. 2, current sensors 260 are configured to monitor the real time current output of SMPS 208 and the IPS 230. In the event that power drawn by the battery charger 200 is less than the output limit (e.g., 120 W) of the SPMS 208, the charging circuit 240 may utilize the "unused", or remaining, power up to the output limit (e.g., up to the 120 W limit) to charge the IPS 230. When the charging circuit 240 is active, the microprocessor 210 may set appropriate output status signals including HC Charging (illustrated in FIG. 2 by LED2 of battery charger module interface 220).

Similarly, if the voltages of any of the IPS 230 storage elements are below a minimum level, the microprocessor 210 may set appropriate output status signals at the battery charger module interface 220, such as lighting LED3 (or changing a graphical user interface such as an LCD) to indicate the depletion of the IPS 230 (illustrated in FIG. 2 as HC Depleted). In some embodiments, when the IPS 230 is below a minimum level (e.g., when the HC Depleted signal is active), HC mode may be prohibited such that the battery charger 200 is limited to the conventional charging operation (e.g., 10 A and 120 W).

In some embodiments, battery charger 200 may receive battery characteristics in a number of ways, including, without limitation: (i) by the shape of the battery acting as a mechanical key, (ii) through use of an optical scanner (e.g., QR code or barcode), (iii) by the battery charger including multiple connectors, each of which connect only to certain types of batteries, and/or (iv) directly from the battery. In response to receiving the battery characteristics, control circuitry 110 may optimally adjust the C-rate, current flow, voltage, and/or other charging parameters.

In embodiments where an optical scanner is used, the microprocessor 210 may monitor for input from an Optical Code Recognition (OCR) module. In some embodiments, a safety component 214 may be an OCR module such as a Bluetooth-enabled smartphone that includes an integrated camera. As illustrated in FIG. 2, safety and user interface components 214 may include an OCR module directly connected to the battery charger 200 (or integrated within battery charger 200). For example, an Inter-Integrated Circuit ($I^2C$) communication protocol may be used to connect an OCR module to the microprocessor 210. Alternatively or additionally, battery charger 200 may include wireless functionality to connect to an OCR Module (e.g., a smart phone with a camera may use a Bluetooth connection to wirelessly connect to the battery charger). As illustrated in FIG. 2, the microprocessor 210 is connected to a Bluetooth-enabled chipset such that wireless communication via the Bluetooth protocol may be used to communication with an OCR module 214. Other wireless protocols may be used as well.

The purpose of the OCR module 214 is to scan an optical code. The optical code may be printed on, or attached to, a battery or may be displayed on an interface (e.g., a graphical interface of a smartphone). The optical code may be implemented in a conventional form such as a QR code or in a custom label format.

The optical code may contain information related to the characteristics of a specific battery or characteristics necessary to charge a specific battery, including, but not limited to: battery chemistry, battery capacity, cell count (voltage), standard charge rate (C) and whether the battery is compatible with fast charge mode or HC mode. In some embodiments, compatibility with HC mode may be represented by battery characteristics as a 1 or 0, such that a value of 1 indicates the battery is compatible with HC mode and a value of 0 indicates the battery is not compatible with HC mode. In some embodiments, compatibility with HC mode may be encrypted within the battery characteristics but not specifically identified by a unique function identifier such as a 1 or 0. In addition, the encrypted data may require a Cyclic Redundancy Check (CRC) code (or other error checking mechanism) to prevent the misuse of encrypted HC mode data to activate HC mode when the battery charger 200 is charging conventional (1 C-rate) batteries.

In some embodiments, HC mode may be prohibited unless the battery charger determines that the battery characteristics of the battery to be charged are safe to charge in HC mode. For example, if the OCR module 214 returns that the battery is compatible with HC mode (and there is sufficient capacity in the IPS 230), the microprocessor 208 may direct the Power Path Selector 250 to switch the IPS 230 into the circuit and allow the battery charger 200 to draw up to the maximum rated output power (e.g., 40 A and 700 W) of the IPS 230. In some embodiments, the microprocessor 208 will activate the HC Active output once the IPS 230 is online (e.g., LED1 of battery charger module interface 220 may be active as illustrated in FIG. 2).

As battery charging continues, the microprocessor 208 may monitor the output current draws (e.g., via current sensors 260). If at any time the current draw goes below the output rating of the SMPS 208, the microprocessor 208 may be configured to switch the IPS 230 back out of the circuit and allow the battery charger 200 to draw power from only the SMPS 208. Once the IPS 230 is offline, the microprocessor 208 may turn off the indication on the user interface 220 of HC Active (e.g., LED1 may be deactivated). The microprocessor 210 may be further configured to further monitor the current draw and direct the power path selector 250 to switch the IPS 230 back into the circuit if the current draw increases to a level of 10 A or greater.

As discussed previously, when power drawn by the battery charger 200 is less than the output limit of the SMPS 208, the charging circuit 240 may use all remaining power (up to the output limit) to charge the IPS 230. It may be beneficial for the battery charger 200 to use the SMPS 208 to provide as much of the power required to charge the battery as possible, up to its rated output (e.g., 10 A, 120 W). In some embodiments, the reserve capacity of the IPS 230 may be limited to peak demand, effectively "duty cycling" the IPS 230 to make effective use of its power reserves, to extend the number of Hyper Charge cycles, and to limit down time.

As illustrated in FIG. 2, the output of the SMPS 208 is connected to NMOS switches 270. In the example shown in FIG. 2, charging circuit 240 is a buck boost, lithium-ion discrete charger, implemented as a constant current, constant voltage (CI/CV) converter. In operation, the CI/CV converter of the charging circuit 240 will run in constant current mode to charge the IPS 230 to a predetermined level, and then switch to constant voltage mode to maintain the charge of the IPS 230. The charging circuit 240 may switch dynamically between these modes on the fly with no intervention of the microprocessor 208.

The charging circuit 240 may have an analog current limit input which will limit the current utilized by the charging circuit 240 to a level between 0 A and 10 A of input current. The power path from the SMPS 208 may include a current sense element and an instrumentation amplifier (not shown) with resistor settable gain, which will output a value of available capacity to the charging circuit 240 to prevent the charging circuit 240 from overloading the SMPS 208.

In a further aspect, the analog current limit allows the IPS 230 charging current to be adjusted continuously based upon the consumption of the power path between the SMPS 208 and the battery (e.g., during conventional charging when the IPS 230 is not being used). As the current needs fluctuate on the power path between the SMPS 208 and the battery that is being charged, the charging circuit 240 may utilize all excess capacity of the SMPS 208.

C. Additional Features

In some embodiments, the battery charger may further include an integrated optical code reader. For example, the battery charger 200 may include a safety component 214 such as an optical character recognition ("OCR") module. The OCR module may be a combination of image processing circuitry and an image sensor (e.g., a laser scanner, a CCD array, a CMOS sensor, a digital camera, a QR code scanner, a internal power sourcebarcode scanner).

The optical reader equipped charger may have various modes of operation. For example, the battery charger 200 may operate in a conventional mode with any battery using the traditional interface controls (e.g., to set charge rate, voltage, current, etc.). In another mode, the battery charger 200 may operate in a rapid entry mode where some charging parameters may be entered via the safety component 214 (e.g., a QR code scanner). Those charging parameters (and possibly other parameters) can then be verified and/or modified by a user prior the start of the charging cycle using the user interface 220. In another mode, all charging parameters may be entered via the safety component 214 (e.g., a QR code scanner). Those charging parameters may then be verified by the user (e.g., via the user interface 220) without the possibility of modification before the start of the charging cycle. Of course, a cancel or abort option may be available at any time.

To support this type of charging, a software program can be provided to users allowing them to generate inexpensive code labels (e.g., a QR code generator designed to be used with a personal computer and a standard household printer and paper or perhaps with adhesive labels) to be used in older style batteries that are not capable of charging at a high C-rate. The software program may restrict the QR codes such that charging parameters for C-rates cannot be changed or cannot be set above a threshold value (e.g., 1-C) to reduce the likelihood of accidents and misuse.

Advantages of this system include, without limitation, compatibility with virtually all existing batteries, improved ease of use, reduced likelihood of user programming error, and low unit cost battery identifiers (i.e., multiple identifiers could be printed on a standard piece of paper or on a single sheet of preconfigured adhesive labels).

Similarly, a battery charger with an integrated safety component (e.g., an optical code reader such as a QR code reader) may have various modes of operation. In one mode of operation, the battery charger 200 may operate in a conventional manner with any battery using the user interface 220 controls. In this mode, no high C-rate charging is enabled for safety purposes.

In another mode of operation, the battery charger 200 may operate in a rapid entry mode where many charging parameters are rapidly entered via the safety component 214. For example, the safety component 214 may be a QR code scanner which may scan a QR code on a battery to be charged. The QR code may contain multiple charging parameters which the microprocessor 210 may use to set the charging circuitry 240 to safely operate the battery charger 200. The charging parameters may be verified and/or modified (e.g., via a switch, button, touchpad, or other input device on user interface 220) by the user. In some embodiments, user input for verification may be provided in the form of verification data at the user interface 220 such as data indicating a switch position being flipped, a button press, a touch input, etc. In this rapid entry mode, high C-rate charging is not allowed. For example, the microprocessor 210 may limit the battery charger 200 to below a maximum C-rate threshold (e.g., 1-C).

In another mode of operation, the battery charger may operate in a fast charge mode (or a high C-rate mode). For example, the battery charger 200 may receive direct entry of battery-specific charging parameters, e.g., from the safety component 214. In some embodiments, the battery charger 200 may have a safety component 214 that is a QR code scanner. The battery charger 200 may use the QR code scanner to scan a QR code for a compatible high C-rate battery, set the charging parameters for battery-specific charging parameters, and operate to safely charge the battery at a high C-rate that will not damage the battery. In this mode, verification of the charging parameters may occur (e.g., via 220) but no modifications of the charging parameters are allowed. However, the charging may always be cancelled or aborted, e.g., via battery charger module interface 220.

Software may be used to generate code labels for these modes as described above. In some embodiments, the software may not allow consumers to generate code labels (e.g., QR codes) that include C-rate data. This may reduce the likelihood of misuse of the high C-rate charging mode and may reduce the number and likelihood of accidents, injuries, and damage. For example, the manufacturer may choose to encrypt the battery-specific code as it relates to C-rate data (or other charging parameters). This encryption may be accomplished in many ways. For example, a QR code (or parts of a QR code) may be encrypted via a Data Encryption Standard (DES) encryption process, Triple DES process, Advanced Encryption Standard (AES) process, or other encryption process.

In some embodiments, compatibility with high C-rate charging mode may be encrypted within the battery-specific data but not specifically identified by a unique function identifier such as a 1 or 0. In addition, the encrypted data may require a Cyclic Redundancy Check (CRC) code (or other error checking mechanism) to prevent the misuse of encrypted HC mode data to activate HC mode when the battery charger 200 is charging conventional (1 C-rate) batteries.

Advantages of operation in previously described modes include, without limitation, compatibility with virtually all existing batteries, compatibility with new high C-rate charging batteries, encryption of charging parameters (such as the charge rate parameter for safety purposes) to prevent misuse, improved ease of use, reduced likelihood of user programming error, and low unit cost battery identifiers.

In some embodiments, a low cost battery charger 200 may include a safety component 214 in the form of an optical reader and may remove all user interface options except a simple switch (e.g., a two-position switch representing Start/Stop functions to activate or deactivate a charging cycle). This type of low cost charger is possible due to the use of the integrated optical scanning system providing the control circuitry with sufficient data for charging parameters such that the battery charger can safely charge the battery.

The size of the power supply, the use of an internal or external power supply and the capacity of the internal power source (as well as accompanying circuitry) can be scaled to best suit various ranges of batteries.

D. Conclusion

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A battery charger, comprising:
   a control circuitry configured to couple to a user interface and further configured to electrically connect to (i) a power supply, (ii) an internal power storage device, and (iii) a battery, wherein the control circuit is configured to:
   receive operating mode instructions from the user interface that correspond to a desired operating mode of (i) a base charging mode or (ii) a fast charging mode;
   receive battery-specific input from the user interface; and
   operate the battery charger in the desired operating mode to charge the battery in the desired operating mode;
   wherein, in the base charging mode, the control circuitry is configured to use power from an external power source to concurrently charge (i) the battery at a base C-rate and (ii) the internal power storage device at the base C-rate; and
   wherein, in the fast charging mode, the control circuitry is configured to use current from the internal power storage device to charge the battery at a high C-rate, where the high C-rate is higher than the base C-rate.

2. The battery charger of claim 1, further comprising a battery charging circuit electrically connected to a battery connector, wherein the battery charging circuit is configured to limit a battery charging characteristic.

3. The battery charger of claim 1, wherein the control circuitry is further configured to limit, based at least in part on the received battery-specific input, the battery charging characteristic.

4. The battery charger of claim 3, wherein the battery-specific input comprises one or more of (i) battery capacity, (ii) battery voltage, (iii) temperature, (iv) C-rate, (v) battery chemistry, and (vi) cell configuration.

5. The battery charger of claim 1, wherein the control circuitry is further configured to limit, based at least in part on the received battery-specific input, an internal power storage device charging characteristic.

6. The battery charger of claim 5, wherein the internal power storage device charging characteristic comprises one or more of (i) over-current, (ii) over-voltage, (iii) under-voltage, (iv), over-temperature, (v) over-pressure, and (vi) ground fault.

7. A method for operating a battery charger, comprising:
   receiving operating mode instructions from a user interface, wherein the operating mode instructions correspond to a desired operating mode for charging a battery of (i) a base charging mode or (ii) a fast charging mode; and
   configuring the battery charger to operate in the desired operating mode;
   wherein the base charging mode comprises configuring the battery charger to use current from an external power source to concurrently charge both (i) an internal power storage device at a base C-rate and (ii) the battery at the base C-rate; and
   wherein the fast charging mode comprises configuring the battery charger to use current from the internal power storage device to charge the battery at a high C-rate, and wherein the high C-rate is higher than the base charging rate.

8. The method of claim 7, further comprising: receiving battery-specific input from the user interface; and limiting, based at least in part on the received battery-specific input, a battery charging characteristic.

9. The method of claim 8, further comprising: limiting, based at least in part on the received battery-specific input, an internal power storage device charging characteristic.

* * * * *